United States Patent [19]
Suzuki et al.

[11] Patent Number: 5,446,892
[45] Date of Patent: Aug. 29, 1995

[54] METHOD OF AND APPARATUS FOR RE-ALLOCATING PROGRAMS IN A DISTRIBUTED PROGRAMMING SYSTEM

[75] Inventors: Yasuo Suzuki, Ebina; Kinji Mori, Yokohama; Katsumi Kawano; Masayuki Orimo, both of Kawasaki; Hiroyuki Ogura, Yokohama, all of Japan

[73] Assignee: Hitachi Ltd., Tokyo, Japan

[21] Appl. No.: 993,667

[22] Filed: Dec. 21, 1992

Related U.S. Application Data

[63] Continuation of Ser. No. 409,614, Sep. 15, 1989, abandoned.

[30] Foreign Application Priority Data

Sep. 19, 1988 [JP] Japan ................. 63-232367

[51] Int. Cl.⁶ .............................................. G06F 15/16
[52] U.S. Cl. .................... 395/650; 364/280; 364/281; 364/281.3
[58] Field of Search .................. 395/650, 700

[56] References Cited

U.S. PATENT DOCUMENTS

| | | |
|---|---|---|
| 4,486,829 | 12/1984 | Mori et al. . |
| 4,532,588 | 7/1985 | Foster . |
| 4,627,055 | 12/1986 | Mori et al. . |
| 4,628,508 | 12/1986 | Sager et al. . |
| 4,748,558 | 5/1988 | Hirosawa et al. ............... 395/650 |
| 4,888,683 | 12/1989 | Koizumi et al. . |

FOREIGN PATENT DOCUMENTS 62-115556  5/1987  Japan .

*Primary Examiner*—Thomas M. Heckler
*Assistant Examiner*—John Q. Chavis
*Attorney, Agent, or Firm*—Antonelli, Terry, Stout & Kraus

[57] ABSTRACT

In a processing method for a distributed processing system have a plurality of processors connected through a network for transferring programs among the processors, each processor introduces a program which circulates in the network, assesses the state of the processor for storing the program in that processor, and judges on the basis of the assessment information whether the introduced program is to be executed in that processor.

15 Claims, 11 Drawing Sheets

FIG. 6

| iCC COUNT (411) | iCC LIST (412) | oCC COUNT (413) | oCC LIST (414) | PROGRAM NAME (351) | PROGRAM CC (374) | LOADING CONDITION (361) |
|---|---|---|---|---|---|---|
|  |  |  |  |  |  |  |
|  |  |  |  |  |  |  |
|  |  |  |  |  |  |  |
|  |  |  |  |  |  |  |

| iCC (332) | oCC (342) | PROGRAM NAME (351) | PROGRAM CC (374) | INPUT/OUTPUT LINKAGE INDEX (384) | PROCESSOR LOAD INDEX (394) |
|---|---|---|---|---|---|
|  |  |  |  |  |  |
|  |  |  |  |  |  |
|  |  |  |  |  |  |
|  |  |  |  |  |  |

402

STRUCTURE

INDEX SECTION

CANDIDATE DATA SECTION

F I G. 10
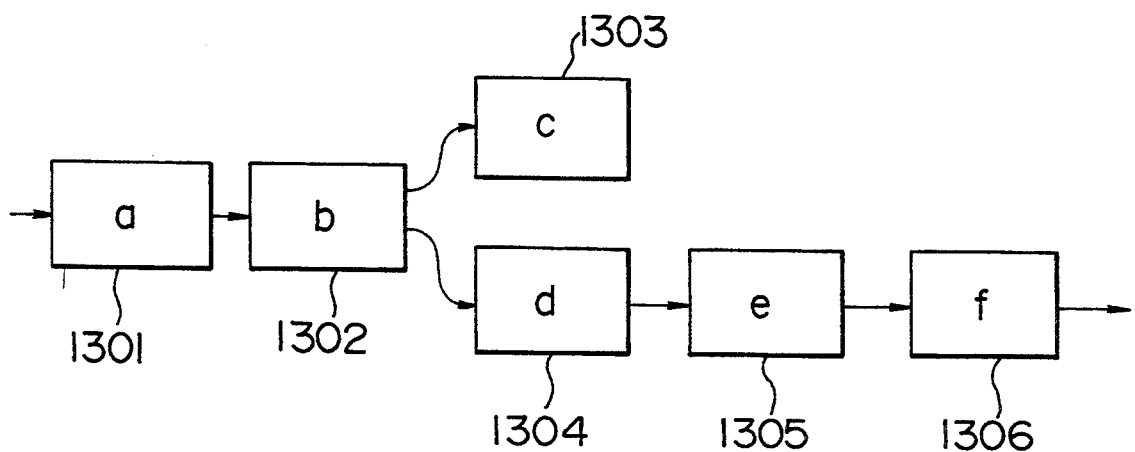
F I G. 12
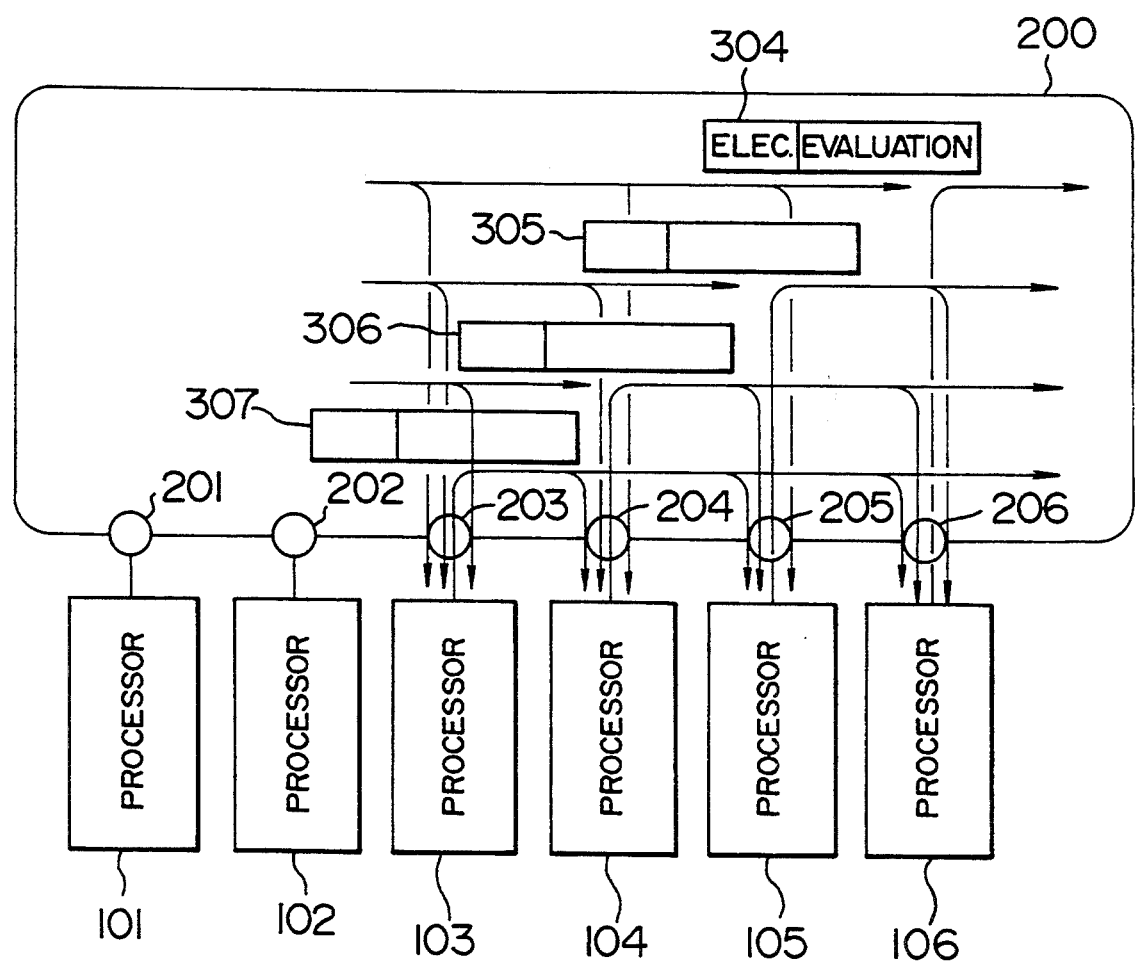

METHOD OF AND APPARATUS FOR RE-ALLOCATING PROGRAMS IN A DISTRIBUTED PROGRAMMING SYSTEM

This is a continuation of application Ser. No. 409,614 filed on Sep. 15, 1989 abandoned.

BACKGROUND OF THE INVENTION

The present invention relates to a distributed processing system which operate, on an on-line basis, to transfer programs among processors that are connected through a network, and particularly to a processing method for each of the processors to relocate programs among computers depending on the program organization.

Conventional distributed systems including a plurality of processors connected through a network are designed to introduce programs to each processor on the basis of a predetermined program loading schedule. In such cases where the occurrence of abnormality in a processor or a program to be introduced has been newly created, as described in JP-A-62-115556, for example, however, such system do not have the concept of allowing each processor to determine a program to be introduced and executed depending on its own situation.

The above-mentioned prior art does not consider unexpected changes in the system organization, and programs to be introduced and executed by each processor are determined in advance and registered. On this account, upon the occurrence of a change accompanied by a failure, recovery, maintenance activity and system expansion, it is necessary for each processor to register again programs to be introduced before executing all necessary programs. This alteration of registration is a change of system design parameters imposed on a running processor, and therefore it is difficult to achieve on-line implementation. If the alteration of registration involves the transfer of a program in execution among computers, it is inevitable to halt the program execution.

Accordingly, in order for each processor to change a program to be introduced and change the program allocation, the system must be halted temporarily, resulting in a lack of flexibility in dealing with a change in the system organization.

SUMMARY OF THE INVENTION

An object of the present invention is to provide a processing method for relocating programs on an on-line basis, in which each processor determines a program to be loaded and executed depending on its program organization and the processing load of process.

In order to achieve thee above objective, the present invention resides in a distributed processing system including a plurality of processors connected through a network and operating to transfer programs among the processors, wherein each processor introduces a program transferred in the network, assesses the situation of the case when the program is stored in the processor, and determines whether the introduced program is to be executed therein.

BRIEF DESCRIPTION OF THE DRAWINGS

FIGS. 6, 7 and 8a–8c are diagrams showing examples of the format of the tables according to the present invention;

FIG. 10 is a diagram showing the program input/output relation as a model for the present invention;

FIG. 12 is a diagram explaining the judgement of the reception of programs; and

DESCRIPTION OF THE PREFERRED EMBODIMENTS

Embodiments of the present invention will be described in detail.

Figure 2:
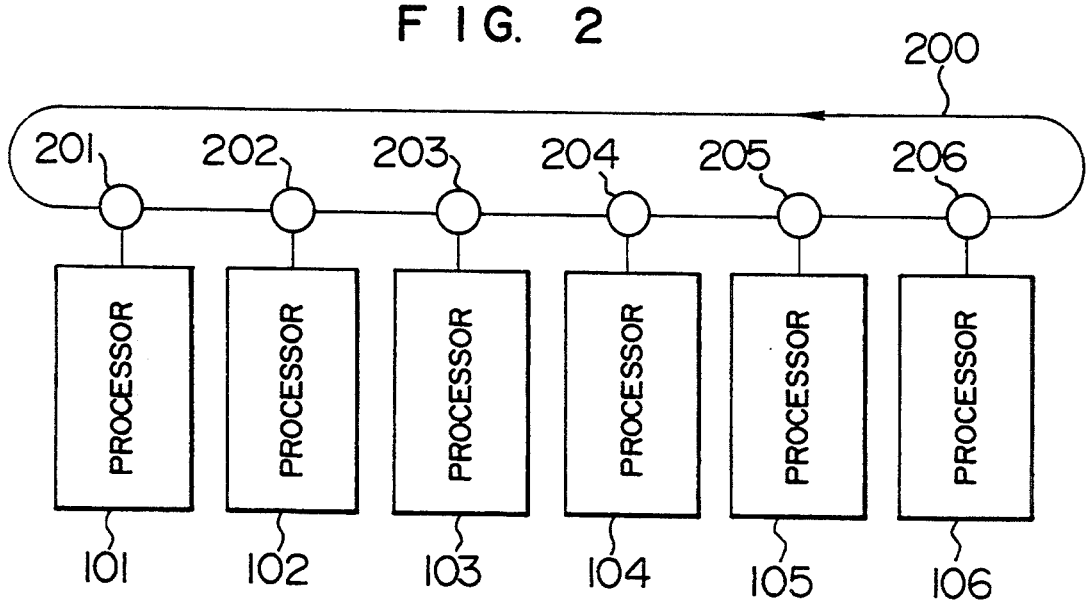
FIG. 2 is a diagram showing the system organization to which the present invention is applied.

FIG. 2 is a diagram showing the overall system arrangement to which the present invention is applied. Although in this embodiment processors are linked through a single loop transmission system, the process is identical to the case where a general network is used.

In FIG. 2, indicated by 101–106 are processors, each loading an application program into its internal memory and executing the program, and 200 is a monodirectional transmission path having a transmission direction indicated by the arrow. Indicated by 201 to 206 are network control processors (NCP) for implementing transmission control for data on the transmission path. The processors 101–106 are connected to the respective NCPs 201–106 through bidirectional transmission paths. The processors 101–106 send messages over the transmission path 200 by way of the respective NCPs 201–206. Each NCP makes a judgement as to whether a message circulating on the transmission path 200 is needed for the associated processor, and, if it is needed, introduces the message to the associated processor. Upon receiving all data in the message necessary for the execution of the application program stored in its memory, the processor initiates the program. The program runs using the introduced data and produces a process result. In case a processor has introduced a program, it stores the program in the internal memory.

Figure 3:
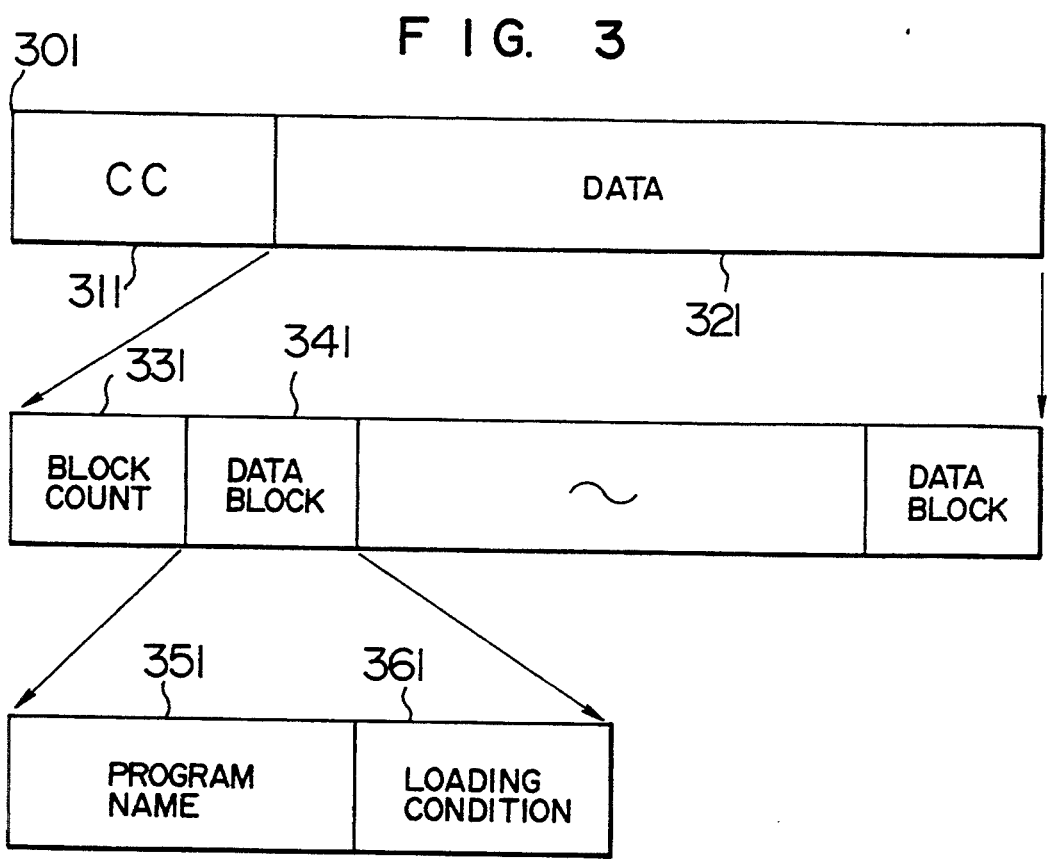
FIGS. 3, 4 and 5 are diagrams showing examples of the format of message according to the present invention.

FIG. 3 shows the format of a program abnormality message 301 which is one of the various types of messages circulating on the transmission path. The format includes a content code field CC 311 which indicates the content of the message, i.e., program abnormality in the example of FIG. 3, and data field 321 indicative of names of abnormal programs. The data field 321 is partitioned into a block count field 331 and data block fields 341. The block count field 331 indicates the number of data block fields 341, each of which is made up of a program name field 351 and loading condition field 361.

Figure 4:
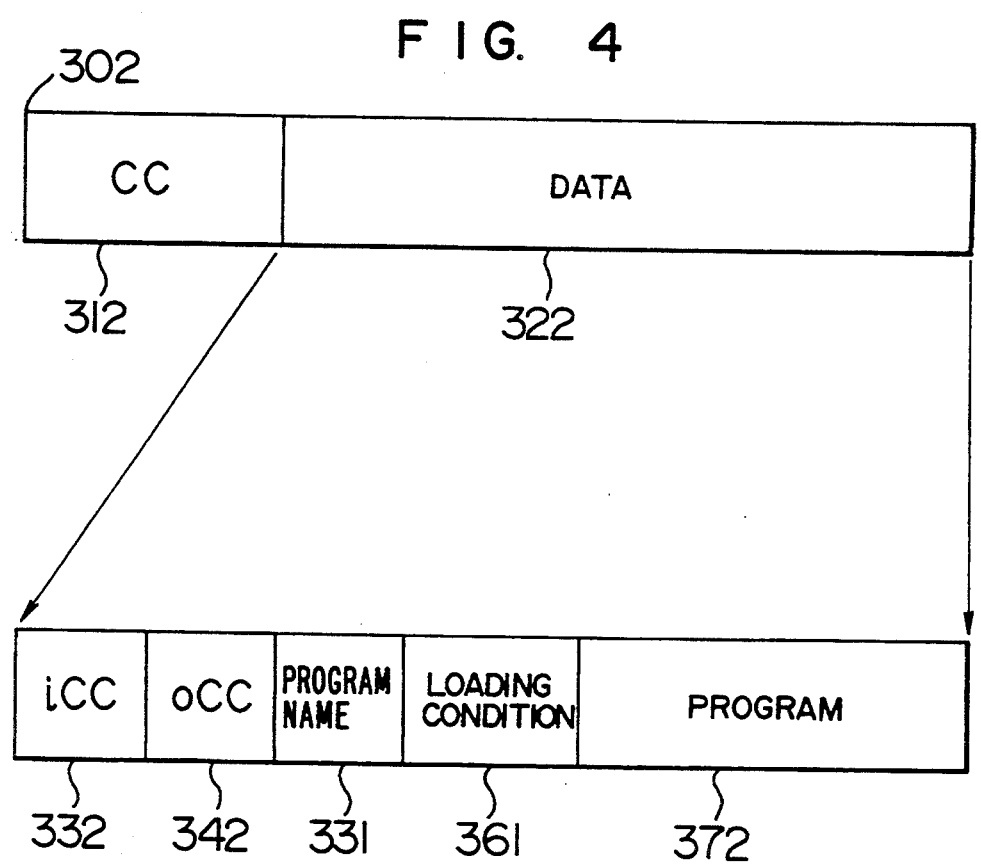

FIG. 4 shows the form at of a program module message 302. The format includes a content code field CC 312 indicative of a program module, and a data field 322 which is made up of an input data content code field ICC 332, output data content code field OCC 342, a program name field 331, a loading condition field 361, and a field of program main body 372.

Figure 5:
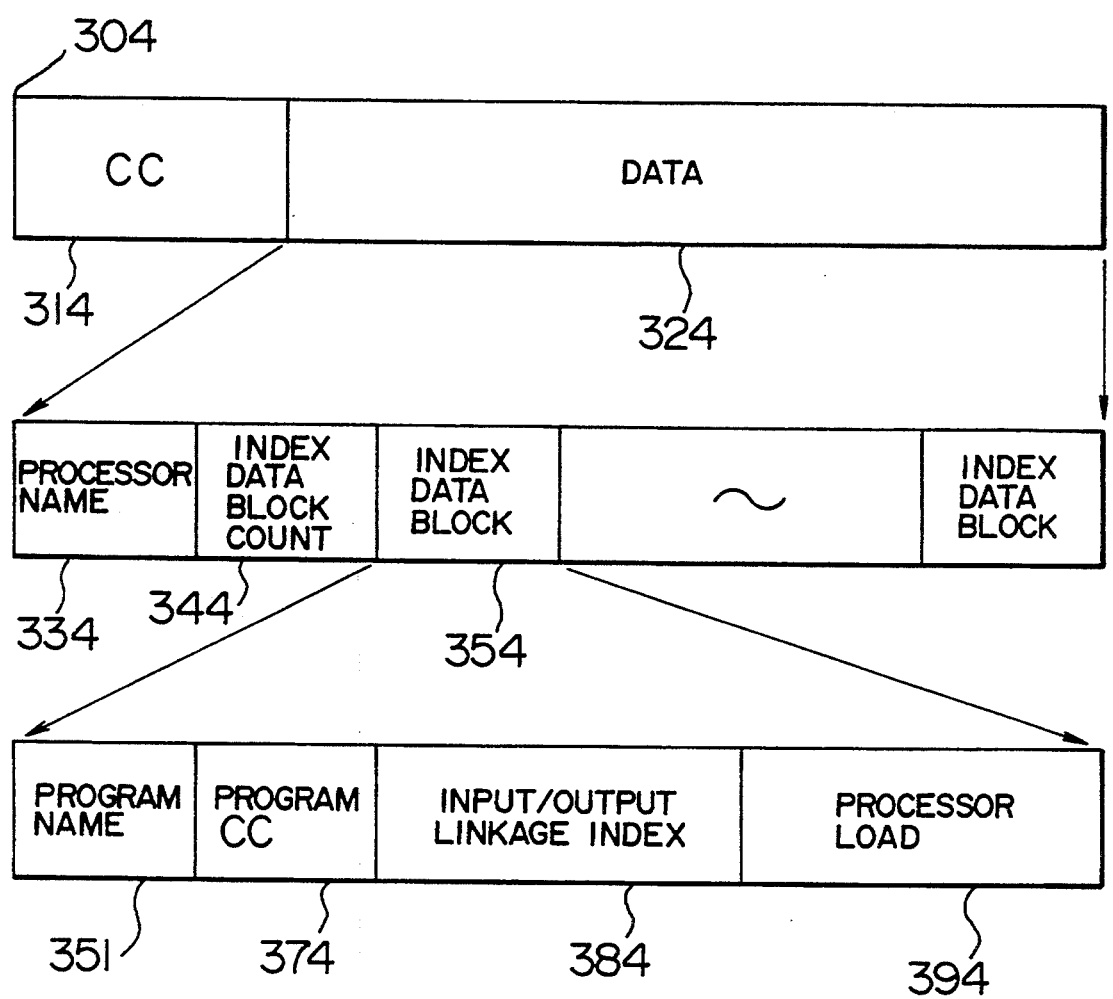

FIG. 5 shows the format of a candidate input program message 304. The format includes a content code field CC 314 indicative of a code which represents a candidate input program, and a data field 324. The data field 324 is made up of a processor name field 334, an index data block count field 344, and index data block fields 354. The index data block count field 344 indicates the number of index data block fields 354, and each index data block field 354 is made up of a program name field 351, a program content code field 374, an input/output linkage index field 384 and a processor load field 394.

FIGS. 6, 7 and 8a–8c show the format of data tables provided in the processor. Shown in FIG. 6 is the format of a program information table 401, which includes a column of input data content code count 411, columns of input data content code 412 the number indicated by the count column 411, a column of output data count code counter 413, a column of output data content code 414 in the number indicated by the count column 413, a column of program name 351 for a program having the attributes indicated by the columns 412 and 414, a column of program content code 374, and a column of loading condition 361.

FIG. 7 shows the format of an assessment information table 402. The table includes columns of input data content code 332, output data content code 342 program name 351, program content code 374, input/output linkage index 384, and processor load index 394.

Figure 8A:
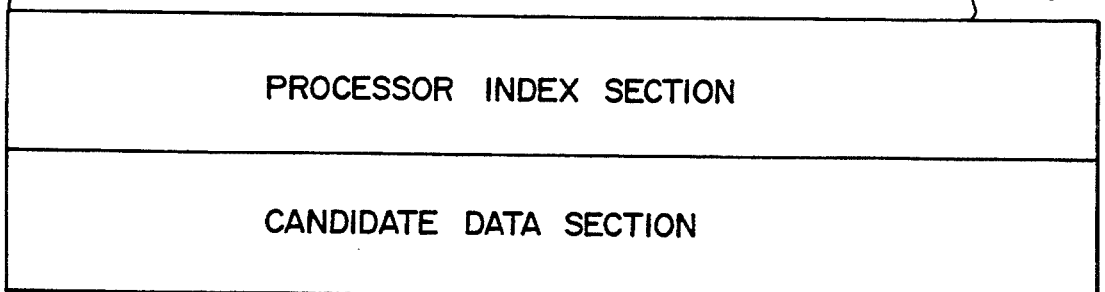
Figure 8B:
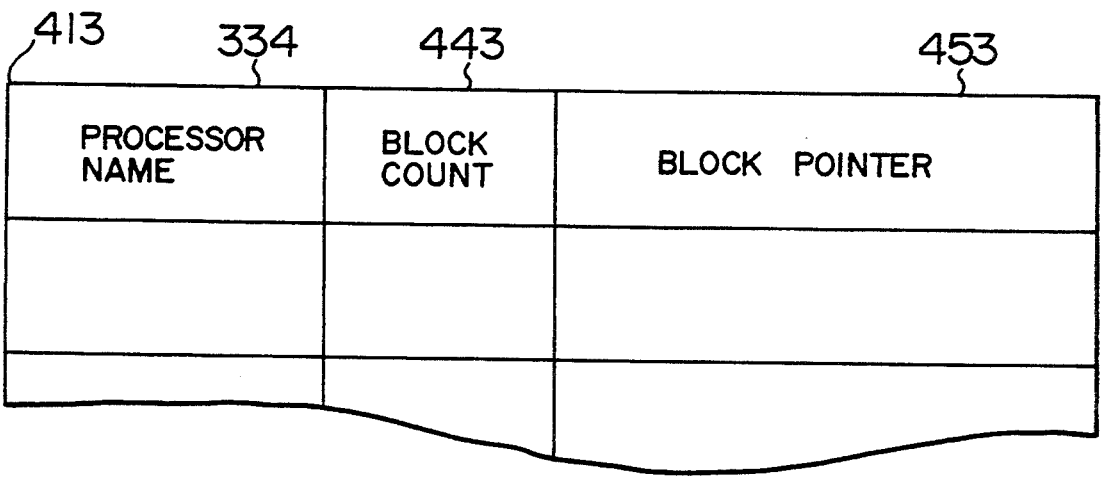
Figure 8C:
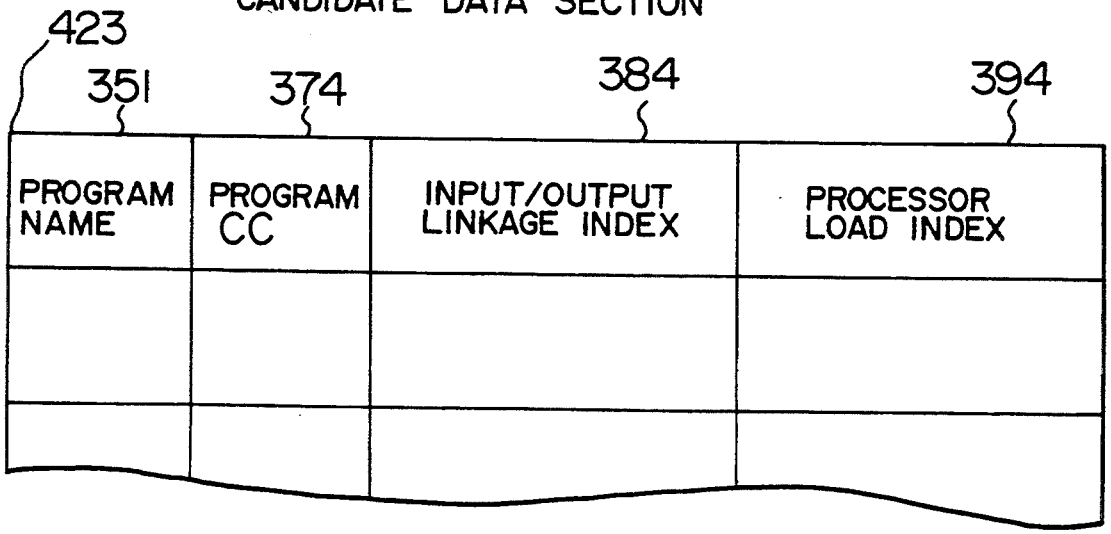

FIGS. 8a–8c shows the format of a selection table 403. The format is made up of a processor index section 413 and a candidate data section 423, as shown in FIG. 8A. The processor index section 413 is made up of a processor name field 334, block count field 443, and a block pointer 453, as shown in FIG. 8B. The candidate data section 423 is made up of a program name field 351, a program content code field 374, an input/output linkage index 384, and processor load index 394, as shown in FIG. 8C.

Figure 9:
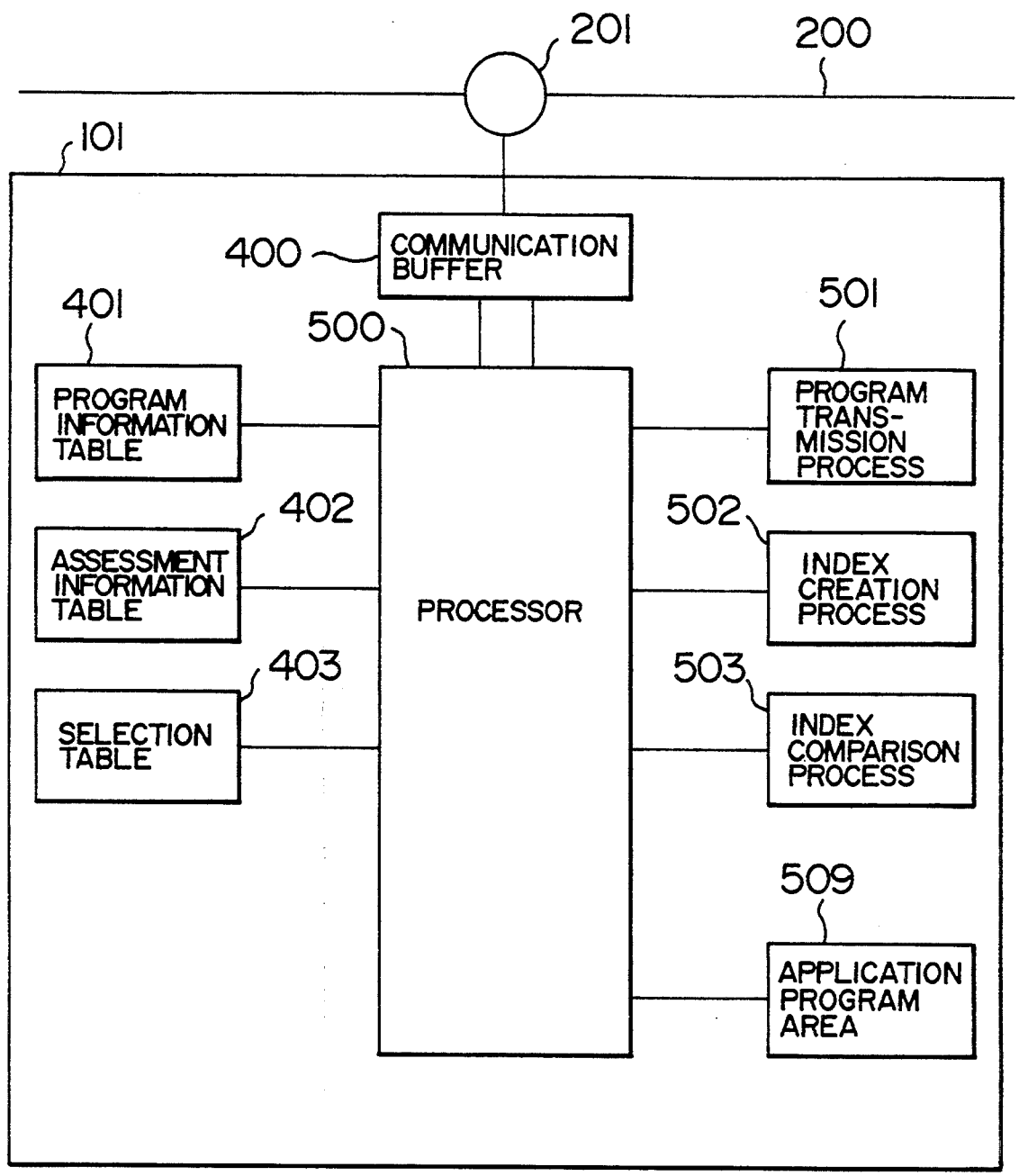
FIG. 9 is a block diagram showing, as an example, the internal arrangement of the processor.

FIG. 9 shows an example of the internal structure of the processor 101 which is connected to the transmission path 200 through the NCP 201. The remaining processors 102 to 106 have the same internal structure. The arrangement includes an operation unit 500, which receives a message from a communication buffer 400 and executes programs stored in the memory for implementing a program transmission process 501, index creation process 502, and index comparison process 503 by making reference to the program information table 401, assessment information table 402 and selection table 403. The execution results are stored in the tables 401–403, and also sent through the communication buffer 400 over the transmission path 200 by way of the NCP 201. An application program area 509 stores usual application programs.

Figure 1:
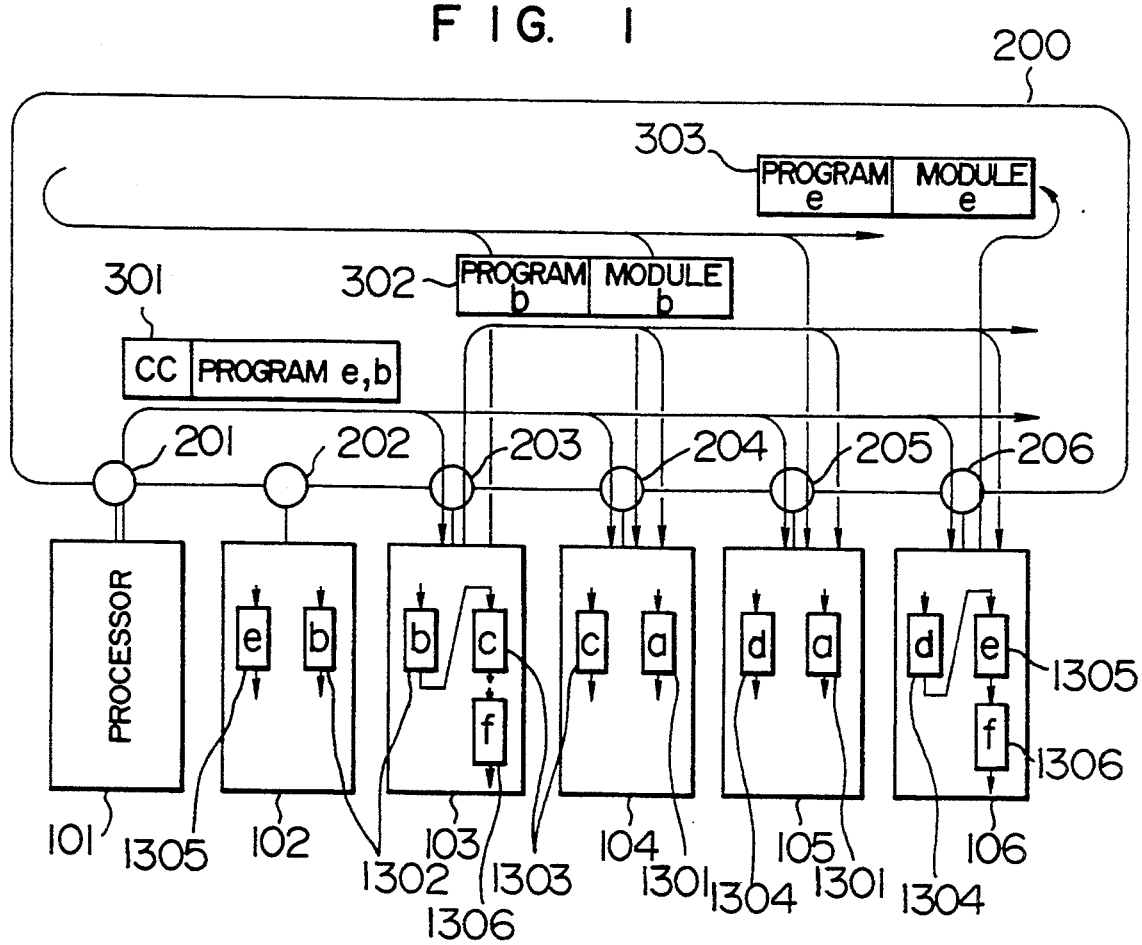
FIG. 1 is a diagram used to explain the process of an embodiment of the present invention.

FIG. 1 shows the process of the embodiment having the foregoing components. The processor 101 has a tester function for monitoring the operational state of the processors 102–106. The processor 102, in which a program b 1302 and program e 1305 are stored, is in a state of failure. The processor 103 stores the program b 1302, a program c 1303 and a program f 1306, the processor 104 stores the program c 1303 and a program a 1301, the processor 105 stores a program d 1304 and the program a 1301, and the processor 106 stores the program d 1304, program e 1305 and program f 1306. It is assumed that each program is stored in two or more processors. The processor 101 detects the failure of the processor 102 by monitoring, and issues a program abnormality message 301, which indicates that the program e 1305 and program b 1302 stored in the processor 102 are unexecutable, onto the transmission path 200 by way of the NCP 201. The program abnormality message 301 is received by the processor 1013, which stores the same program b 1302 as indicated by the message, and it copies the program from its memory and sends the copied program in the form of a program module message 302 onto the transmission path 200 by way of the NCP 203. Similarly, the processor 106 receives the program abnormality message 301 and copies the relevant program e 1305 stored in it to produce a program module message 303 and sends the program module message 303 onto the transmission path 200 by way of the NCP 206. The processors 104 and 105 also receive the program abnormality message 301, but they do not store the relevant program and therefore do not send a program module message. Each processor receives the program module message 302 containing the program b 1302 and the program module message 303 containing the program e 1305, unless it is the processor that issued the message.

FIG. 10 shows the use of input/output data by the programs. The program a 1301 produces an output, which is the input of the program b 1302. The program b 1302 produces two outputs, one, becoming the input to the program c 1303, the other becoming the input to the program d 1304. The program d 1304 has an output which is inputted to the program e 1305, the program e 305 has an output, which is inputted to the program f 1306. Shown in FIG. 10 is a model intended only for the explanation of the embodiment, and actually a software-based facility for exchanging messages among the programs suffices for this purpose.

Figure 11:
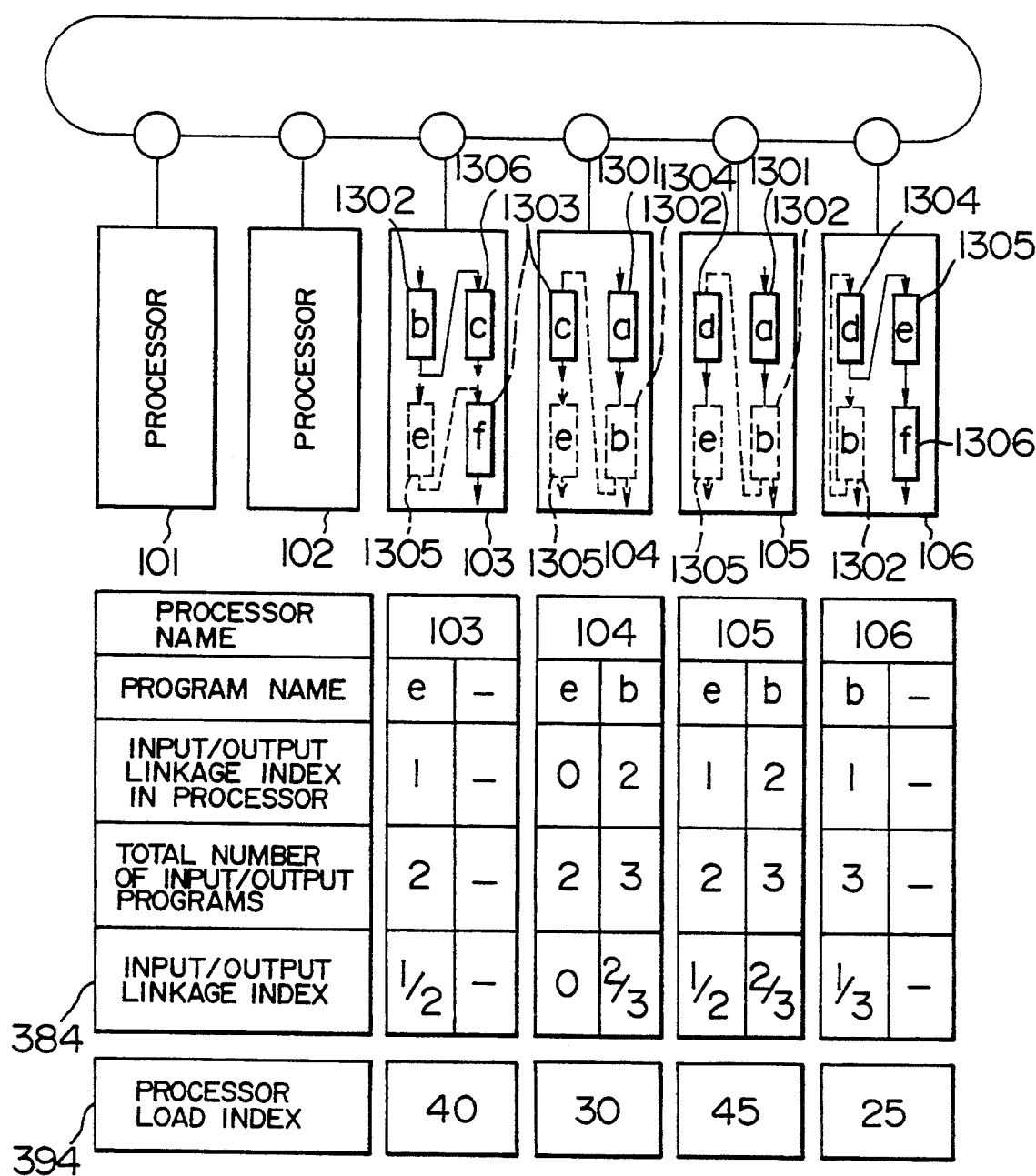
FIG. 11 is a diagram showing, as an example, the method of assessment of the storing of programs.

FIG. 11 shows the assessment process for the acceptance of one or both of the program module messages 302 and 303 explained on FIG. 1. The input/output linkage index 384 is defined to be the ratio of the sum of the input and output programs that are intended to be newly stored (total number of input/output programs) to the number of newly stored input or output programs that are becoming the output or input of other already-stored programs (number or input/output linkage within the processor). Based on this definition, the processor 103 has a value of input/output linkage index 284 of ½ for the program e 1305, the processor 104 has a value of input/output linkage index of 0 for the program e 1305 and a value of ⅓ for the program b 1302, the processor 105 has a value of index of ½ for the program e 1305 and a value of ⅔ for the program b 1302, and the processor 106 has a value of index of ⅓ for the program b 1302. Based on an index criterion, each processor can determine individually as to whether a program is to be stored in it. Assuming the criterion to be 0.49 in FIG. 11, the processor 103 stores the program e 1305, and the program e 1305. The processor 106 does not store any program. The assessment indexes for programs to be newly stored include the one related to the load of the processor, in addition to the one related to the frequency of program transaction among the processors, as in the case of the input/output linkage index 384. The load of the processor shown in FIG. 11 is an example in which the load is represented by the rate of use of a program area in storing introduced programs. One or both of these indexes can be the value-of assessment.

FIG. 12 shows a method of solving a possible case that the individual determination of storing by each processor based on the index of FIG. 11 does not guarantee the unfavorable multiplicity of storing, i.e., storing at three or more locations or no storing at all. The processors 103–106 receive programs and send out candidate data 307–304 which contain values of indexes shown in FIG. 11. A processor waits for a certain length of time after the first message has arrived until the same message from another another processor arrives. This scheme allows each processor to compare its own index with indexes of other processors, thereby guaranteeing the above-mentioned multiplicity of storing. The indexes of FIG. 11 are applied to FIG. 12, and the processors 104 and 105 have the same index for the program b 1302, while the processors 103 and 105 have the same point index for the program e 1305. If the loading condition 361 shown in FIG. 6 permits triple storing of a program, processors 104 and 105 both store the program b 1302, while processors 103 and 105 both store the program e 1305. If is triple storing not permitted, a processor with a smaller processor load index 394 recognizes itself to be relevant and stores the program For the program b 1302 only the processor 104 recognizes itself to be relevant and stores the program. For the program e 1305, only the processor 103 recognizes itself to be relevant and stores the program.

Figure 13:
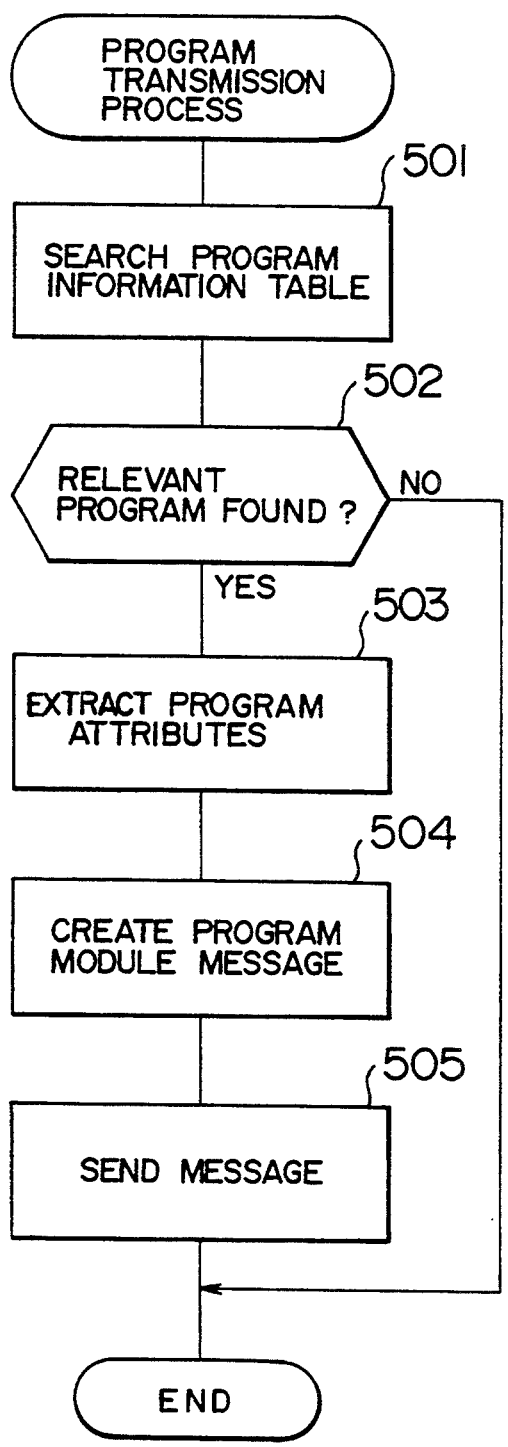
FIGS. 13, 14 and 15 diagrams showing examples of the processing procedure according to the present invention.

FIG. 13 is a flowchart showing the processing procedure for sending the program module message in FIG. 1. The program name 351 is extracted from the program abnormality message 301 and based on the program name as a key the program information table 401 is searched (step 501). If a relevant program has not been found as a result of the search (step 502), the process is terminated. When a relevant program is found, such program attributes as the program name 351, program content code 374, program input content code 412, program output content code 414 and loading condition 361 are extracted from the program information table 401 (step 503). A content, code is appended to the attributes to complete the format of the program module message 302, and it is sent out (steps 504 and 505).

Figure 14:
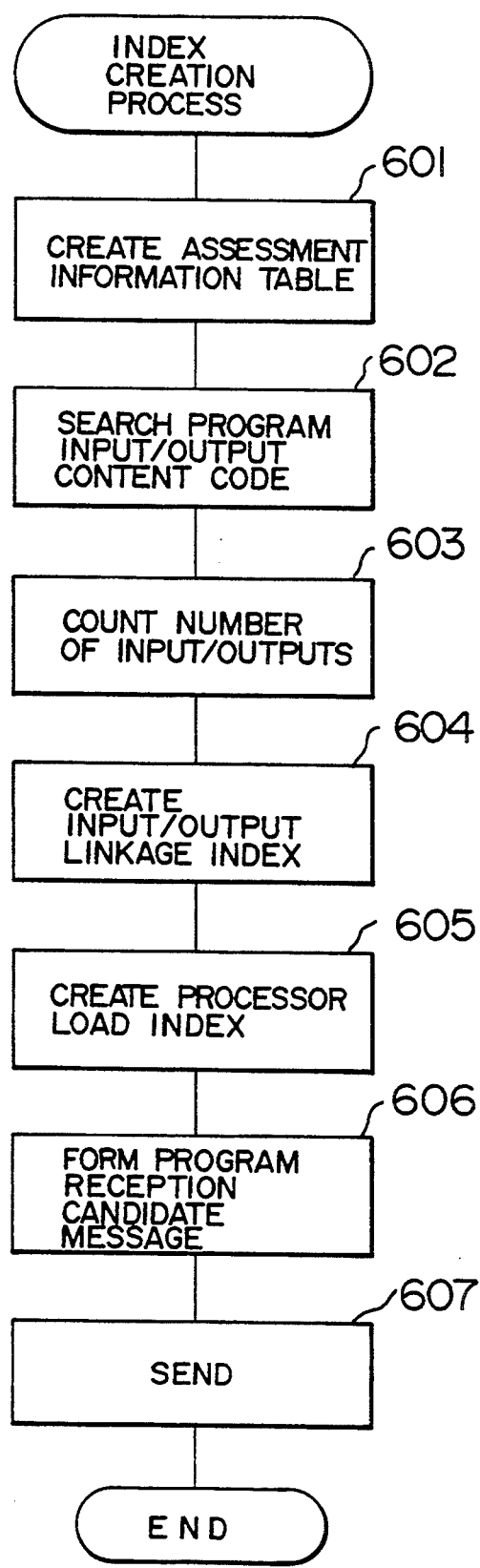

FIG. 14 shows the processing procedure for creating the assessment index FIG. 11. An assessment information table 402 is created for the introduced program (step 601). Using the program input content code 332 and program output content code 342, which have been put in the table, as a key, the program information table 401 is searched (step 602). Next, the numbers of inputs and outputs are counted for each program (step 603). From the ratio of these counts, the input/output linkage index is created (step 604). After that, the processor load index is created (step 605), a program reception candidate message is formed (step 606), and it is sent out (step 607).

Figure 15:
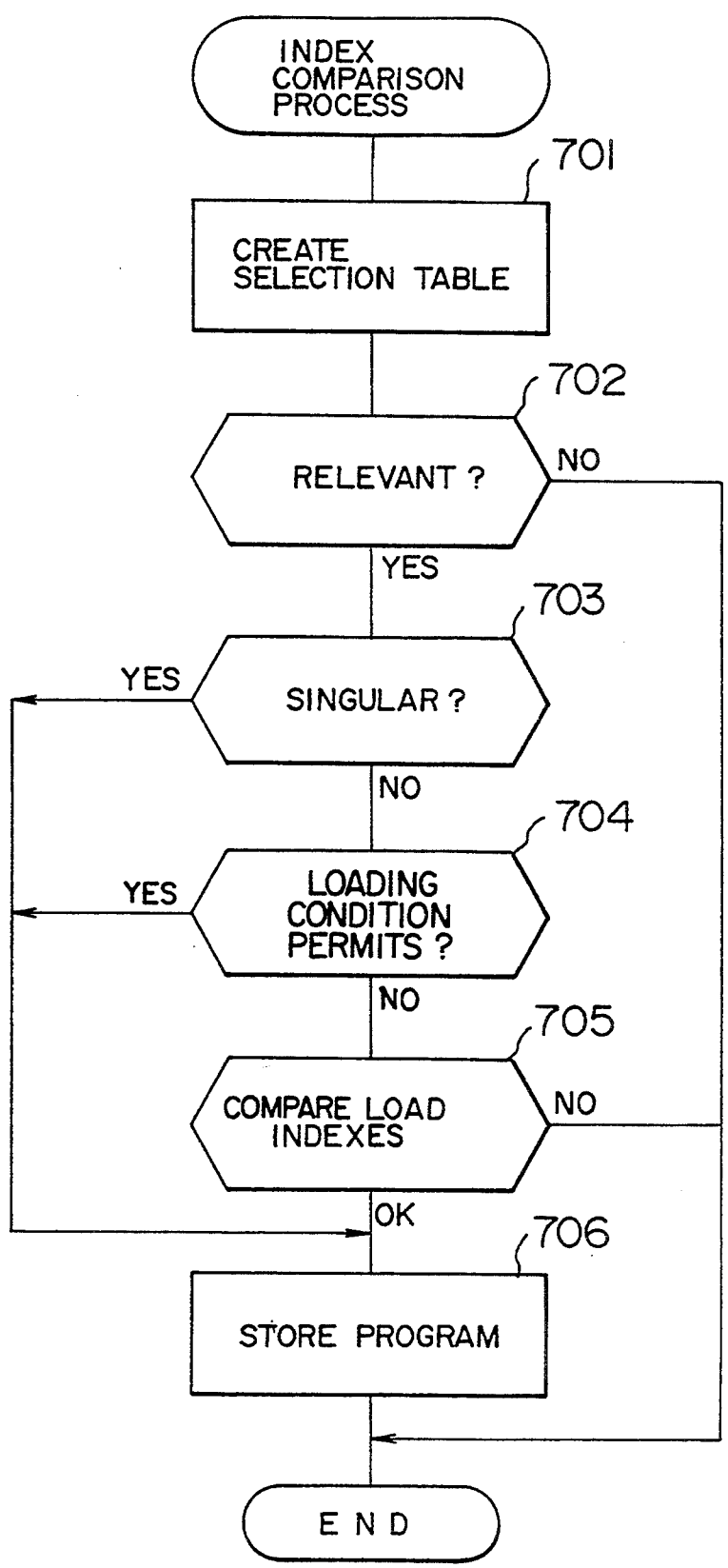

FIG. 15 shows the processing procedure for the assessment of the candidates in FIG. 12. Initially, program reception candidate messages 304–307 from other processors are memorized in the selection table 403 (step 701). The selection table is searched using the program name 351 of any of the program reception candidate messages 304–307 of its own as a key (step 702), and if a relevant program is found, the input/output linkage index 384 of the program is referenced for comparison. This operation is conducted for the entirety of the selection table 403 thereby to test whether the input/output linkage index 384 of its own candidate data has a maximum value (step 702). When the index is not a maximum, the process is terminated. When the index is a maximum, the singularity of the maximum value is tested (step 703), and if it is affirmed, the pertinent program is stored (step 706). If the maximum value is not singular, i.e., candidates having the same index are present, the loading condition is tested (step 703), and if it permits the storing of triple or higher degree, the program is stored as in the singular maximum case (step 706). If the loading condition does not permit, the processor load indexes 394 are compared, and a processor having a smaller value is determined to be relevant.

According to the present invention, which is meant for a distributed system comprising a plurality of processors connected through a network and operative to transfer programs among the processors on an on-line basis, programs can be relocated so that the traffic of programs among the processors is reduced and the processors have balanced processing load, whereby when a program developing processor or a program executing processor fails or when the processor organization is changed in such a case of connecting a processor, which has not yet loaded a program, to the network, programs can be relocated to these processors in an on-line operation.

What is claimed is:

1. A method for allocation of programs in a distributed processing system including a plurality of processors connected to each other via a network, the method comprising the steps of:
   (a) sending a program module message including a program from one processor of the system to all of the processors of the system via the network;
   (b) receiving, in at least one other processor of the system, the program module message sent from the one processor;
   (c) creating, in each of the at least one other processor, an assessment index indicative of a status of that processor;
   (d) sending, from each of the at least one other processor, a candidate message including the assessment index for that processor and a code identifying that processor to all of the processors of the system via the network;
   (e) receiving, in each of the at least one other processor, each candidate message sent from the at least one other processor except the candidate message sent from that processor;
   (f) comparing, in each of the at least one other processor, the assessment index for that processor with the assessment index included in each candidate message sent from the at least one other processor except the candidate message sent from that processor; and
   (g) determining, in each of the at least one other processor, whether the program included in the program module message sent from the one processor is to be stored in that processor for execution by that processor based on a result of the comparing in the step (f).

2. A method according to claim 1, wherein the steps (f) and (g) are not performed until a predetermined period of time has elapsed after the step (e) is performed.

3. A method according to claim 1, wherein the assessment index is related to a frequency of program transaction in that processor.

4. A method according to claim 3, wherein the assessment index is created in the step (c) based on an input/output linkage index representing the frequency of program transaction in that processor.

5. A method according to claim 1, wherein the assessment index is related to a processing load of that processor.

6. A method according to claim 1, wherein one of the processors of the system is a failure detection processor; and wherein the step (a) includes the steps of:
(a1) detecting a failed processor among the processors of the system with the failure detection processor;
(a2) sending, from the failure detection processor, a program abnormality message including a name of a program which is stored in the failed processor to all of the processors of the system via the network;
(a3) receiving, in each of the processors except the failure detection processor and the failed processor, the program abnormality message sent from the failure detection processor;
(a4) determining, in each of the processors except the failure detection processor and the failed processor, whether the program which is stored in the failed processor is also stored in that processor based on the name of the program included in the program abnormality message; and
(a5) sending, from each of the processors in which it is determined in the step (a4) that the program which is stored in the failed processor is also stored in that processor, a program module message including the program which is also stored in that processor to all of the processors of the system via the network;
wherein the one processor in the step (a) is any one of the processors in which it is determined in the step (a4) that the program which is stored in the failed processor is also stored in that processor.

7. A distributed processing system including a plurality of processors connected to each other via a network, the processors including at least two processors each comprising:
means for sending a program module message including a program to all of the processors of the system via the network;
means for receiving a program module message including a program sent from one other one of the at least two processors;
means for creating an assessment index indicative of a status of the processor;
means for sending a candidate message including the assessment index for the processor and a code identifying the processor to all of the processors of the system via the network;
means for receiving a candidate message sent from each of at least one other processor of the at least two processors;
means for comparing the assessment index for the processor with the assessment index included in each candidate message sent from the at least one other processor of the at least two processors;
means for determining whether the program included in the program module message sent from the one other one of the at least two processors is to be stored in the processor for execution by the processor based on a result of the comparing performed by the comparing means.

8. A system according to claim 7, wherein the assessment index is related to a frequency of program transaction in the processor.

9. A system according to claim 8, wherein the creating means creates the assessment index based on an input/output linkage index representing the frequency of program transaction in the processor.

10. A system according to claim 7, wherein the assessment index is related to a processing load of the processor.

11. A system according to claim 7, wherein one of the processors of the system other than the at least two processors is a failure detection processor comprising:
means for detecting a failed processor among the at least two processors; and
means for sending a program abnormality message including a name of a program which is stored in the failed processor to all of the processors of the system via the network; and
wherein the determining means of each of the at least two processors includes:
means for receiving the program abnormality message sent by the failure detection processor;
means for determining whether the program which is stored in the failed processor is also stored in the processor based on the name of the program included in the program abnormality message; and
means for sending a program module message including the program which is also stored in the processor to all of the processors of the system via the network if it is determined that the program which is stored in the failed processor is also stored in the processor;
wherein the one other one of the at least two processors is any one of the at least two processors in which it is determined that the program which is stored in the failed processor is also stored in the processor.

12. A method for allocation of programs in a distributed processing system including a plurality of processors connected to each other via a network, the method comprising the steps of:
(a) sending a program module message including a program from one processor of the system to all of the processors of the system via the network;
(b) receiving, in at least one other processor of the system, the program module message sent from the one processor;
(c) creating, in each of the at least one other processor, an assessment index indicative of a frequency of program transaction in that processor if the program included in the program module message sent from the one processor were stored in that processor; and
(d) determining, in each of the at least one processor, whether the program included in the program module message sent from the one processor is to be stored in that processor for execution by that processor based on the assessment index for that processor.

13. A method according to claim 12, wherein the assessment index is created in the step (c) based on an input/output linkage index representing the frequency of program transaction in that processor if the program included in the program module message sent from the one processor were stored in that processor.

14. A distributed processing system including a plurality of processors connected to each other via a network, the processors including at least two processors each comprising:

means for sending a program module message including a program to all of the processors of the system via the network;

means for receiving a program module message including a program from one other one of the at least two processors;

means for creating an assessment index indicative of a frequency of program transaction in the processor if the program included in the program module message sent from the one other one of the at least two processors were stored in the processor; and means for determining whether the program included in the program module message sent from the one other one of the at least two processors is to be stored in the processor for execution by the processor based on the assessment index for the processor.

15. A system according to claim 14, wherein the creating means creates the assessment index based on an input/output linkage index representing the frequency of program transaction in the processor if the program included in the program module message sent from the one other one of the at least two processors were stored in the processor.

* * * * *